US005529425A

United States Patent [19]

Spies et al.

[11] Patent Number: 5,529,425

[45] Date of Patent: Jun. 25, 1996

[54] FOLDABLE WALKER WITH A LOCKING MECHANISM

[75] Inventors: James T. Spies, Spencer; Robert R. Bly, Wellington, both of Ohio

[73] Assignee: Invacare Corporation, Cleveland, Ohio

[21] Appl. No.: 276,891

[22] Filed: Jul. 19, 1994

[51] Int. Cl.$^{6}$ ................................ A45B 9/00; F16B 1/04

[52] U.S. Cl. ............................ 403/322; 403/321; 135/74

[58] Field of Search ........................ 135/67, 74; 403/322, 403/321, 325, 113, 112

[56] References Cited

U.S. PATENT DOCUMENTS

| | | | |
|---|---|---|---|
| 2,796,916 | 6/1957 | Womble | 135/67 |
| 3,658,079 | 4/1972 | Block . | |
| 3,688,789 | 9/1972 | Bunch . | |
| 3,690,652 | 9/1972 | Schneider . | |
| 3,783,886 | 1/1974 | Thomas . | |
| 4,298,016 | 11/1981 | Garelick . | |
| 4,461,471 | 7/1984 | Brastow . | |
| 4,518,002 | 5/1985 | Battiston, Sr. et al. . | |
| 4,640,301 | 2/1987 | Battiston, Sr. et al. . | |
| 4,830,035 | 5/1989 | Liu . | |
| 5,188,139 | 2/1993 | Garelick | 135/74 X |
| 5,255,696 | 10/1993 | Leonard . | |
| 5,275,187 | 1/1994 | Davis | 135/74 X |

FOREIGN PATENT DOCUMENTS

| | | | |
|---|---|---|---|
| 21642 | 8/1914 | United Kingdom | 403/321 |
| 919044 | 2/1963 | United Kingdom | 135/67 |

*Primary Examiner*—Anthony Knight
*Attorney, Agent, or Firm*—Fay, Sharpe, Beall, Fagan, Minnich & McKee

[57] ABSTRACT

A locking assembly for use with a foldable walker having a pair of side frames, each having a tubular front leg concentrically contained within an end sleeve of a cross brace, includes a housing secured to each of the side frame front legs. Each housing closely receives a locking pin extending through a first bore. The locking pin is movable between first and second positions and includes a locking end which extends into an aperture of a lock plate connected to the end sleeve of the cross brace. An actuating lever pivotally connected to the housing includes a force applying handle which, when depressed, causes the lever to rotate about a pivot point and raise the locking pin from the lock plate aperture thus allowing the side frame to rotate with respect to the cross brace.

20 Claims, 2 Drawing Sheets

FOLDABLE WALKER WITH A LOCKING MECHANISM

BACKGROUND OF THE INVENTION

This invention relates generally to a locking assembly, and more particularly to a locking assembly for use with a foldable walker. This invention is particularly applicable to a locking mechanism for use with a foldable walker having a pair of side frames, each including a tubular front leg rotatably contained within a respective end sleeve of a cross brace, the side frames being rotatable from a first locked position to a second unlocked position. As applied to a walker, the locking assembly locks the side frames to the cross brace in an open position for use by a handicapped person. Through the use of a lever handle, the locking assembly allows the handicapped person to quickly unlock and easily fold the side frames simply by applying a downward and inward force to the handle. While the locking assembly will be described with application to foldable walkers, it will be appreciated that the invention has broader applications and may be advantageously employed in other devices having rotatable concentrically contained tubular elements.

Prior art locking mechanisms used in connection with foldable walkers have suffered from various drawbacks. The drawbacks stem from the limited manual dexterity of handicapped people. For example, some prior art assemblies are operated through use of a lever. These devices require the handicapped user to lift or pull the lever in order to unlock the foldable walker. However, certain people with limited dexterity may be incapable of exerting enough force to lift a lever and thus will be unable to operate such a locking assembly. Also, the lever handles of the prior art are often narrow. This presents additional problems for users having diminished manual dexterity. The narrowness of the handle makes finding and gripping the lever difficult. This is particularly true for users having a debilitating disease affecting their fingers, such as rheumatoid arthritis.

Still other prior art locking assemblies for walkers utilize a pin actuating plunger located remotely from the handles of the walker. Often, these prior art pin actuating plungers are positioned on a cross brace away from a walker's handles. In this configuration, a handicapped person with limited dexterity is required to release the handles in order to operate the pin actuating plunger mounted on the cross brace. However, during the period in which the handicapped user has released the handle, the handicapped user is unbalanced, creating a greater likelihood that the user may fall. Moreover, by positioning the pin actuating plunger on a cross brace, the handicapped user with limited dexterity is required to use two hands in order to fold each side brace, e.g., using one hand to depress the plunger while the other hand folds in the side brace.

It has, therefore, been considered desirable to produce a locking assembly for use with a foldable walker which is both economical to manufacture and relatively easy to operate. The design of the locking assembly must eliminate the difficulties that a handicapped person with limited dexterity will experience. The locking assembly should be located adjacent the walker handle and allow the walker to be folded using simple downward and inward applied force.

The subject invention is deemed to meet the foregoing needs and provide a new locking assembly for use with a foldable walker which overcomes the above-noted problems and others.

SUMMARY OF THE INVENTION

According to one aspect of the invention, a locking assembly is provided for use with a cylindrical member concentric with and rotatably mounted in a tubular member. The locking assembly comprises a locking pin positioned parallel to a longitudinal axis of each of the two members and located external thereto. The locking pin is movable between a first position in which the two members are held in a locked state and a second position in which the members are in an unlocked state so that the two members are able to rotate in relation to each other. A lock plate is secured to one of the two members and extends transversely to the longitudinal axis thereof. The lock plate has an aperture adapted to receive a locking end of the locking pin when the pin is in the first position. A lever assembly is provided for moving the locking pin from its first position to its second position to permit rotation of the cylindrical member in relation to the tubular member. This lever assembly includes a housing member attached to another of the two members, and an actuating lever having a force-applying handle end and a lock releasing end operatively connected to an actuator end of said locking pin. The actuating lever is pivotally received by the housing member so that when a downward force is applied to the handle end, the actuating lever pivots with respect to said housing member and moves the locking pin to its second position thereby allowing the two members to moved from a locked state to an unlocked state.

According to a second aspect of the invention, a foldable walker is provided having a pair of side frames each of which has a substantially vertical front tubular leg. The foldable walker further includes a cross brace having a pair of substantially vertical ends sleeves in which the tubular legs are concentrically contained so that the tubular legs are rotatable between a locked state and an unlocked state. A locking assembly is also provided and is associated with each corresponding tubular leg. The locking assembly includes a first body portion having a first bore through which extends the tubular leg along a first longitudinal axis. A fastener rigidly connects the first body portion to the tubular leg, the fastener extending transversely to the first longitudinal axis and into both the first body portion and the tubular leg. A locking pin is movable between a first position in which the tubular leg and sleeve are in a locked state and a second position in which the tubular leg and sleeve are in an unlocked state. A second body portion rigidly connected to the first body portion has a second bore through which extends the locking pin along a second longitudinal axis wherein the first and second longitudinal axes are in relatively parallel position. A lock plate is rigidly connected to the end sleeve and extends transversely to the first and second longitudinal axes. The lock plate has an aperture which is adapted to receive a locking end of the locking pin when the locking pin is in its first position. To move the locking pin between its first and second position, an actuating lever is provided which has a force applying handle end and a lock releasing end operatively connected to an actuator end of the locking pin. The actuating lever is pivotally received by the first body portion so that when a downward force is applied to the handle end, the actuating lever pivots with respect to the first body portion and moves the locking pin from its first position to its second position thereby allowing the tubular leg to be moved from its locked state to its unlocked state.

One advantage of this invention resides in the provision of a new and improved locking assembly which is particularly useful with foldable walkers or the like.

Another advantage of this invention resides in the provision of a novel lock assembly for use with two concentrically contained light weight elements, one of which is capable of rotation with respect to the other.

Still another advantage of the present invention resides in the provision of a locking assembly which includes a locking pin that is located external to and parallel to a pair of concentric elements and is spring loaded to a locking position. Externally locating the locking pin with respect to the elements allows the locking mechanism to be assembled more easily and economically.

Still another advantage of this invention resides in the provision of a locking assembly having an actuating lever which is operable with the application of a downward force. Handicapped users who may be incapable of applying an upward force to lift the levers of the prior art locking assemblies will be able to unlock a foldable walker using the present invention by simply applying a downward force to the actuating lever.

Yet another advantage of the present invention is the provision of a locking assembly having an actuating lever in close proximity to a walker handle. This construction allows the side braces of the walker to be simultaneously folded inward while the actuating lever is being depressed. Not only does this configuration reduce the time it takes to release the handle during which the user may be unstable, but it allows the user to fold a side brace using a single hand.

A further advantage of the present invention resides in the provision of a locking assembly having an actuating handle which has a broad operating end which allows a user with limited manual dexterity to find and operate the locking mechanism with relative ease.

Other objects and advantages of the present invention will become apparent from reading the following description of the invention wherein reference is made to the accompanying drawings.

BRIEF DESCRIPTION OF THE DRAWINGS

The invention may take physical form in certain parts and arrangements of parts a preferred embodiment of which will be described in detail in this specification and illustrated in the accompanying drawings which form a part hereof and wherein.

DETAILED DESCRIPTION OF THE PREFERRED EMBODIMENT

Figure 1:
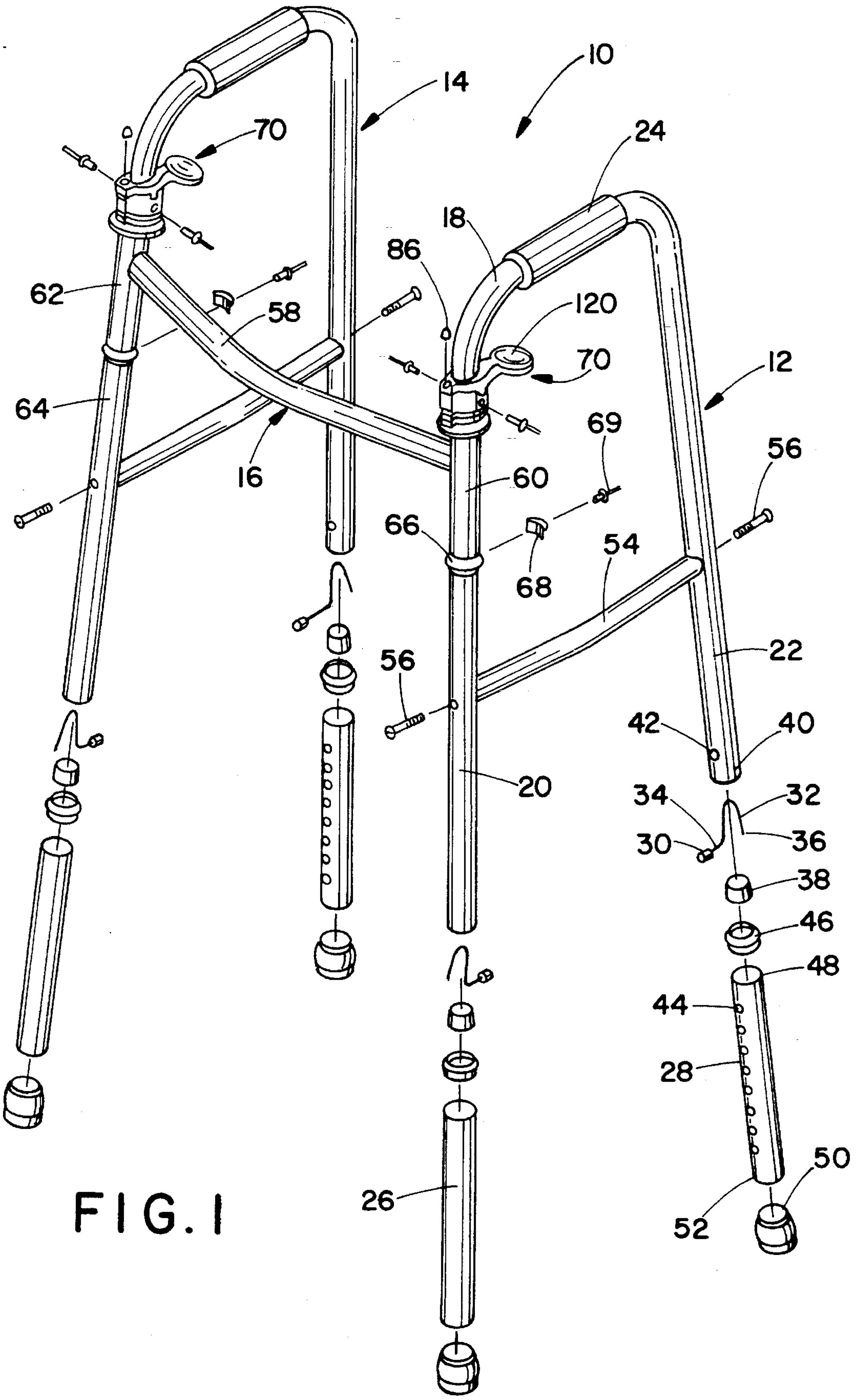
FIG. 1 is an exploded perspective view of a foldable walker of the type in which the locking assembly of the present invention is employed.

Referring now to the drawings wherein the showings are for purposes of illustrating a preferred embodiment of the invention only and not for purposes of limiting same, FIG. 1 shows a walker 10 which includes a pair of spaced side frames 12 and 14 and a cross brace 16 for connecting the two side frames. Side frames 12 and 14, and cross brace 16 can be made from a lightweight and sturdy metallic material such as conventional aluminum or steel. Preferably, the metallic material of the side frames and cross brace is tubular in nature to reduce the weight of the walker. Since the left side frame 14 is identical to right side frame 12, the description of the two is identical. Thus only the right side frame 12 will be described in detail herein. The right side frame 12 includes a top substantially horizontal support arm 18 joining substantially vertical front and rear legs 20 and 22. A non-sliding hand grip 24 fits snugly around the horizontal support arm 18. The hand grip is preferably formed from a suitable conventional polymeric material.

Releasably connected to the ends of the front and rear tubular legs 20 and 22 are front and rear telescoping tubular leg extensions 26 and 28, respectively. The telescoping tubular leg extensions will be described only with respect to tubular leg extension 28. However, this description applies equally to identical tubular leg extension 26. These telescoping extensions allow the walker to be adjusted in accordance with the height of the individual user. The telescoping extensions are connected to the legs using a snap button 30 and biasing spring 32. A first end 34 of the biasing spring 32 is fixedly connected to the snap button 30 while a second end 36 of the biasing spring 32 is designed to abut an inside wall of the rear tubular leg 22. An anti-rattle plug 38 is inserted into the rear tubular leg 22 to retain the snap button 30 and biasing spring 32 assembly therein. The rear tubular leg extension 28 slides concentrically over the rear leg 22.

The assembly is positioned so that the snap button 30 extends through an aperture 42 formed in the rear tubular leg 22 and a mutually aligned one of a plurality of apertures 44 formed in the rear tubular leg extension 28. In this configuration, the snap button 30 locks the rear tubular leg 22 to the rear tubular leg extension 28 at the desired relationship between the leg and the extension. An anti-rattle ring 46 is adapted to fit over the rear tubular leg 22 and the tubular leg extension 28. The ring 46 is adapted to prevent a first end 48 of the extension 28 from moving with respect to the rear tubular leg 22. A crutch tip 50 is adapted to fit in a second end 52 of the tubular leg extension 28 to prevent sliding movement between the walker 10 and the ground. In contrast to the metallic nature of the cross brace 16 and the side frames 12 and 14, the anti-rattle plug 38, ring 46, and tip 52 are preferably made from a suitable conventional thermoplastic material.

A side brace 54 is connected to side frame 12 using fasteners 56 such as pop rivets. The side brace reinforces the side frame 12 to prevent a spreading of the legs 20 and 22 of the walker 10 when the walker 10 is supporting the weight of the user.

The cross brace section 16 comprises a cross bar 58 connected to a pair of substantially vertical end sleeves 60 and 62 which snugly embrace and surround intermediate portions of the front legs 20 and 64, respectively, of side frames 12 and 14. Anti-rattle ring 66 is wedged between end sleeve 60 and front leg 20 to prevent contact therebetween. The ring can be formed from a polymeric material. A walker plate 68 is fixedly connected to the front leg 20 just below the end sleeve 60 to act as a sleeve stop so that the sleeve 60 can not slide down the leg. The walker plate 68 is attached using a conventional fastener 69 such as a pop rivet.

Figure 3:
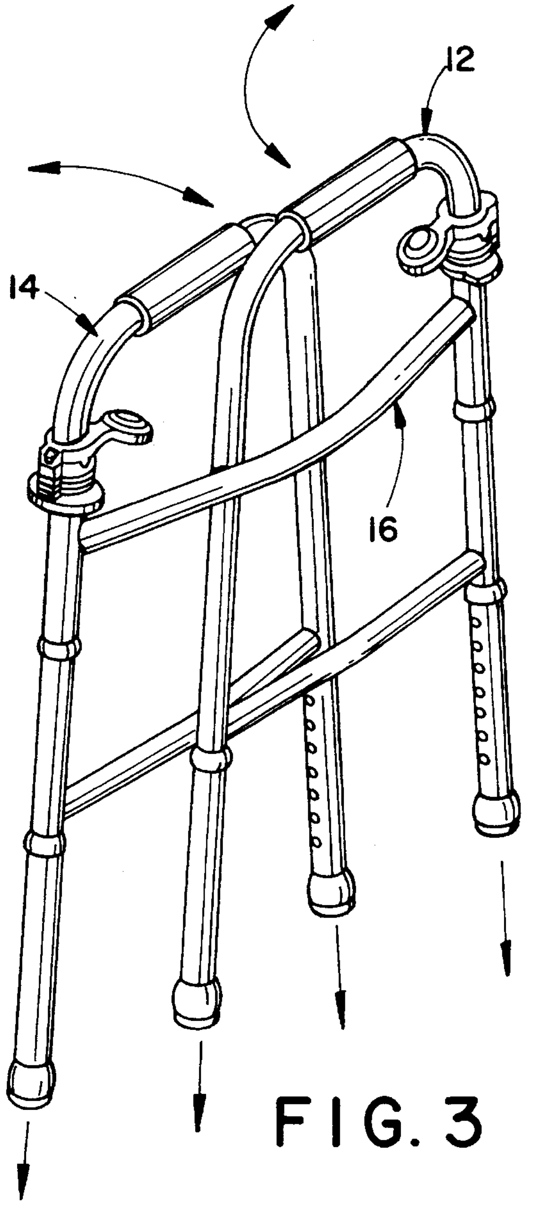

For convenience of handling and storage, the side frames 12 and 14 may be folded inwardly relative to the cross brace to the position shown in FIG. 3. Yet, to make the walker stable during use, the side frames 12 and 14 are required to be locked to the end sleeves 60 and 62 to prevent rotation when in the operative, open position shown in FIG. 1.

Accordingly, a novel locking assembly 70 cooperates with each of the front legs 20 and 64 and its associated end sleeves 60 and 62 to lock the walker in its operative position, as shown in FIG. 1, or to enable the walker to be folded into its storage position easily, as shown in FIG. 3. The locking assembly will be described only with respect to right side frame 12 and end sleeve 60. However, it should be appreciated that an identical locking assembly is provided for left side frame 16 and end sleeve 62.

Figure 2:
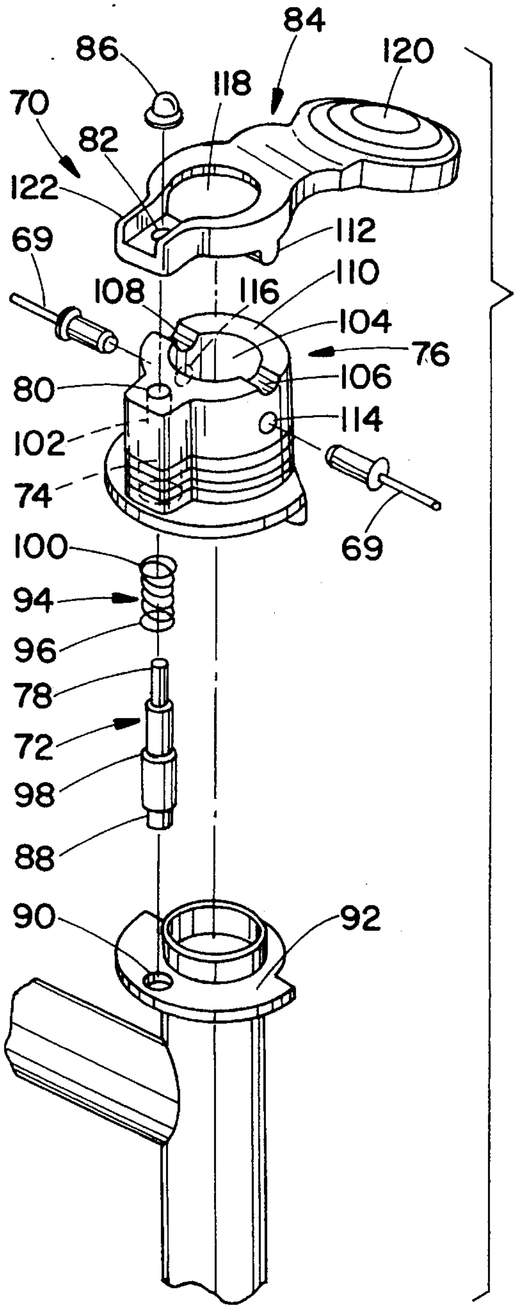
FIG. 2 is an enlarged exploded perspective view of a locking assembly portion of the foldable walker of FIG. 1; and, FIG. 3 is a perspective view of the assembled walker of FIG. 1 in its folded position.

FIG. 2 illustrates the locking assembly 70 in an exploded perspective form. The locking assembly 70 comprises a locking pin 72 formed of a suitable metallic material extending through a pin bore 74 of a pin housing 76. An actuating end 78 of the locking pin 72 projects outwardly from an upper opening 80 of the pin bore 74 of the housing 76 and through an aligned opening 82 of an actuating lever 84. Both the pin housing 76 and the actuating lever 84 are formed from suitable light weight plastic materials. A push nut 86 or similarly configured fastener is fixed on the actuating end 78 located external to the actuating lever 84. A locking end 88 of locking pin 72 is adapted to snugly extend through an opening 90 of a lock plate 92 to lock front leg 20 and end sleeve 60 together and retain the walker in the operative, open position. It will be appreciated that the lock plate 92 is fixedly attached, such as by welding, to the outer periphery of end sleeve 60 and extends substantially normal thereto. A biasing spring 94 surrounds the locking pin 72 within the pin bore 74. The spring has a first end 96 which sits on a pin shoulder seat 98 and a second end 100 which abuts an inner shoulder 102 of the pin bore 74. The biasing spring 94 normally urges the pin locking end 88 into the lock plate opening 90 when they are aligned as shown in FIG. 2.

The pin housing 76 is generally cylindrical having a longitudinal bore 104 extending therethrough and adapted to receive the front leg 20. Arcuate grooves 106 and 108 are disposed 180° apart on an upper surface 110 of the pin housing 76. Groove 106 is adapted to receive a pivot extension 112 of the actuating lever 84. Groove 108 is adapted to receive a similar pivot extension (not visible in FIG. 2). The pivot extensions cooperate with the arcuate grooves 106, 108 to provide a fulcrum around which the actuating lever 84 can rotate. Fasteners in the form of pop rivets 69 extend through openings 114 and 116 to rigidly connect the locking assembly to the right side frame 12. It should be appreciated that the locking assembly prevents any upward sliding motion of the cross brace 16. Thus the cross brace is trapped between the walker plate 68 and the pin housing 76.

The actuating lever 84 has a transverse bore 118 which is aligned with the housing bore 104 to accommodate the front leg 20. The bore 118 is configured to allow actuating lever rotation about the previously described fulcrum while the tubular front leg 20 is extended therethrough. To unlock front leg 20 from end sleeve 60, locking pin 72 must be pulled upwardly so that the locking end 88 is completely removed from the lock plate opening 90. This action is accomplished conveniently and efficiently by use of a walker patient's hand or arm, as the patient may be able, to depress a broad handle 120 of the actuating lever 84 downwardly. This, in turn, rotates the actuating lever 84 around the fulcrum causing an actuating end 122 of the lever to raise the locking pin 72. Once the locking pin 72 is completely withdrawn from the lock plate opening 90, front leg 20 may then be rotated by the patient in relation to the sleeve 60 by an inward motion of the patient's arm towards his side. In this way, the right frame 12 can be folded against the cross brace, since the locking end 88 will merely slide over the flat surface of the lock plate 92.

As mentioned earlier, the locking assembly 70 associated with the left front leg 64 and end sleeve 62 is identically actuated to permit folding of the left side frame 14. As illustrated in FIG. 1, the actuating handle 120 extends below hand grip 24. Because of the proximity between the actuating handle 120 and hand grip 24, a handicapped user need only release the hand grip 24 for a short time to initiate folding of the walker. This reduces the time during which the handicapped user cannot use the walker as a supportive brace. Thus, the present invention reduces the chance that the user will lose his or her balance when folding the walker. Also, a minimum amount of downward force need be applied to the actuating handle 120 in order to withdraw the locking pins 72 from the lock plate openings 90. Moreover, while the actuating handle 120 is depressed and the locking pin 72 is removed from the lock plate opening 90, the side frames may be folded inwardly using a forearm. As a result, the present invention allows the walker side frame to be folded without simultaneous use of two hands. Thus, it is very easy and convenient for the handicapped person to release the locking pins 72 and rotate the side frames 12 and 14 from their open positions of FIG. 1 to their folded storage position of FIG. 3. The folded walker can easily be unfolded by rotating the side frames until the respective locking pin 72 snaps into the respective lock plate opening 90.

The invention has been described with reference to the preferred embodiment. Obviously, modifications and alterations will occur to others upon a reading and understanding of this application. It is intended to include all such modifications and alterations insofar as they come within the scope of the appended claims or equivalents thereof.

Having thus described the invention, it is now claimed:

1. A locking assembly for a first member concentric with and rotatably mounted in a tubular second member, said locking assembly comprising:

- a locking pin positioned parallel to a longitudinal axis of each of said first and second members and located external thereto, said locking pin being movable between a first position in which said members are held in a locked state and a second position in which said members are in an unlocked state such that said first and second members are able to rotate in relation to each other;
- a lock plate secured to one of said first and second members and extending transversely to the longitudinal axes thereof, said lock plate having an aperture adapted to receive a locking end of said locking pin when said pin is in its first position; and
- a lever assembly for moving the locking pin from its first position to its second position to permit rotation of said first member in relation to said second member, said lever assembly including:
- a housing attached to another of said first and second members, and
- an actuating lever having a force-applying handle end and a lock-releasing end operatively connected to an actuator end of said locking pin, said actuating lever being pivotally received by said housing so that when a downward force is applied to the handle end, said actuating lever pivots with respect to said housing and moves said locking pin to its second position allowing said first and second members to be moved from their locked state to their unlocked state.

2. The locking assembly according to claim 1 wherein the housing includes a first body portion having a first bore through which extends the first member, and a second body portion having a second bore through which extends the locking pin.

3. The locking assembly according to claim 2 further comprising a spring for biasing said locking pin towards said first position, said spring adapted to be received in a recessed portion of said second bore and having a first end operatively engaging said locking pin and a second end operatively engaging a shoulder seat of said recessed portion.

4. The locking assembly according to claim 1 wherein the lock-releasing end of said actuating lever includes an aperture through which said actuating end of said locking pin extends.

5. The locking assembly according to claim 4 further comprising a fastener attached to said actuating end of the locking pin for connecting said locking pin to said actuating lever.

6. The locking assembly according to claim 2 wherein said actuating lever includes a third bore through which extends the first member wherein said first and third bores are aligned.

7. The locking assembly according to claim 1 wherein the housing includes a rim on which first and second spaced arcuate grooves are disposed.

8. The locking assembly according to claim 7 wherein the actuating lever includes first and second pivot extensions adapted to be retained in said first and second arcuate grooves, respectively, wherein said pivot extensions and arcuate grooves cooperate to provide a fulcrum about which said actuating lever rotates.

9. A foldable walker comprising:

- a pair of side frames each having a substantially vertical front leg;
- a cross brace having a pair of substantially vertical end sleeves wherein a respective front leg is concentric with and held in one of said end sleeves so that said front legs are rotatable in relation to said cross brace between a locked state and an unlocked state;
- a locking assembly associated with each corresponding front leg and end sleeve, each said locking assembly comprising:
  - a housing secured to said front leg,
  - a locking pin extending through a first bore in said housing, said locking pin being movable between a first position in which said front leg and end sleeve are in the locked state and incapable of rotating in relation to each other and a second position in which said front leg and end sleeve are in an unlocked state and capable of rotating in relation to each other,
  - a lock plate connected to said end sleeve and extending substantially transversely to the longitudinal axis thereof, said lock plate having an aperture adapted to receive a locking end of said locking pin when said locking pin is in the first position; and
  - an actuating lever pivotally held on said housing, said lever having a force applying handle end and a lock releasing end operatively connected to an actuator end of said locking pin, wherein a downward force applied to the handle end, will pivot said actuating lever with respect to said housing member and move said locking pin to its second position allowing said front leg to be moved from its locked state to its unlocked state.

10. The foldable walker according to claim 9 wherein the housing member includes a first body portion having a second bore through which extends the leg, and a second body portion through which said first bore extends.

11. The foldable walker according to claim 10 further comprising a spring for biasing said locking pin towards said first position, said spring adapted to be received in a recessed portion of said first bore and having a first end operatively engaging said locking pin and a second end operatively engaging a shoulder seat of said recessed portion.

12. The foldable walker according to claim 9 wherein the lock releasing end of said actuating lever further comprises an aperture through which the actuating end of said locking pin extends.

13. The foldable walker according to claim 12 further comprising a fastener attached to the actuating end of the locking pin for connecting said locking pin to said actuating lever.

14. The foldable walker according to claim 10 wherein the actuating lever includes a third bore through which extends the leg, wherein said first and third bores are in alignment.

15. The foldable walker according to claim 10 wherein the housing includes a rim on which first and second arcuate grooves are disposed.

16. The foldable walker according to claim 15 wherein the actuating lever includes first and second pivot extensions adapted to be retained in said first and second arcuate grooves respectively, wherein said pivot extensions act in connection with said arcuate grooves to provide a fulcrum about which said actuating lever rotates.

17. A foldable walker comprising:

- a pair of side frames each having a substantially vertical front tubular leg;
- a cross brace having a pair of substantially vertical end sleeves wherein said tubular legs are concentrically contained in said sleeves so that said tubular legs are rotatable between a locked state and an unlocked state;
- a locking assembly associated with each corresponding tubular leg and sleeve, said locking assembly comprising:
  - a first body portion having a first bore through which extends said tubular leg along a first longitudinal axis;
  - a fastener for rigidly connecting said first body portion to said tubular leg, said fastener extending transversely to the first longitudinal axis and into both the first body portion and the tubular leg;
  - a locking pin movable between a first position in which said tubular leg and sleeve are in the locked state and a second position in which said tubular leg and sleeve are in an unlocked state;
  - a second body portion rigidly connected to said first body portion having a second bore through which extends the locking pin along a second longitudinal axis, said first and second longitudinal axes being in relative parallel position;
  - a lock plate rigidly connected to said sleeve and extending transversely to the first and second longitudinal axes, said lock plate having an aperture adapted to receive a locking end of said locking pin when said locking pin is in the first position;
  - an actuating lever having a force-applying handle end and a lock-releasing end operatively connected to an actuator end of said locking pin, said actuating lever being pivotally received by said first body portion so that when a downward force is applied to the handle end, said actuating lever pivots with respect to said first body portion and moves said locking pin from the first position to the second position allowing said tubular leg to be moved from its locked state to its unlocked state.

18. The foldable walker of claim 17 further comprising a spring for biasing said locking pin towards its first position and closely received in said second bore.

19. The foldable walker of claim 17 wherein the first body portion includes a rim on which first and second arcuate grooves are disposed.

20. The foldable walker according to claim 19 wherein the actuating lever includes first and second pivot extensions adapted to be retained in said first and second arcuate grooves, respectively, wherein said pivot extensions and arcuate grooves operate to provide a fulcrum about which said actuating lever operates.

* * * * *